United States Patent
Oddy et al.

(10) Patent No.: US 6,480,122 B1
(45) Date of Patent: Nov. 12, 2002

(54) POWER SUPPLY FOR ETHERNET LAN CONNECTED TELEPHONE

(75) Inventors: Douglas Oddy, Greely; Gayle Moss, Ottawa; Ann Hatchell, Dunrobin, all of (CA)

(73) Assignee: Mitel Knowledge Corporation (CA)

( * ) Notice: Subject to any disclaimer, the term of this patent is extended or adjusted under 35 U.S.C. 154(b) by 0 days.

(21) Appl. No.: 09/710,174

(22) Filed: Nov. 10, 2000

(30) Foreign Application Priority Data

Nov. 12, 1999 (CA) .............................................. 9926913

(51) Int. Cl.[7] ............................................. H04M 11/04
(52) U.S. Cl. .................. 340/999; 340/310.01; 375/257; 370/271; 379/102.04
(58) Field of Search ...................... 340/310.01, 310.08, 340/999; 370/271; 375/257; 455/3.03; 379/102.04

(56) References Cited

U.S. PATENT DOCUMENTS

| | | | |
|---|---|---|---|
| 5,148,144 A | * | 9/1992 | Sutterlin et al. ............ 340/310 |
| 5,297,141 A | | 3/1994 | Marum |
| 5,945,631 A | * | 8/1999 | Henrikson et al. ...... 174/102 R |
| 6,140,911 A | * | 10/2000 | Fisher et al. ........... 340/310.01 |
| 6,218,930 B1 | * | 4/2001 | Katzenberg et al. ... 340/310.01 |

* cited by examiner

Primary Examiner—Jeffrey Sterrett
Assistant Examiner—Gary L. Laxton
(74) Attorney, Agent, or Firm—Jones, Day, Reavis & Pogue

(57) ABSTRACT

A powering arrangement for providing power to an Ethernet connected device, comprising a power unit connected via a first terminal to the device and via a second terminal to an Ethernet cable carrying two signal wire pairs and two spare wire pairs. A connection is provided within the power unit for interconnecting the signal wire pairs and a first one of the two spare wire pairs to the device, and a source of power is provided within the power unit connected to a second one of the spare wire pairs from the device for providing power thereto.

4 Claims, 1 Drawing Sheet

POWER SUPPLY FOR ETHERNET LAN CONNECTED TELEPHONE

FIELD OF THE INVENTION

This invention relates in general to telephones, and more particularly to a system for providing power to an Ethernet LAN connected telephone.

BACKGROUND OF THE INVENTION

Conventional telephones and ISDN phones are normally powered at −48 V DC via tip and ring signal wires. However, telephones which include additional set functionality often require a separate power supply (derived either from an AC source or battery) in order to provide power to some or all telephone features. This results in additional cables or wires to the telephone, which introduces objectionable clutter to a user's desktop.

In the case of Ethernet LAN connected telephones (often referred to as IP Phones), an international standard is being developed for providing power to such telephones from a central location via an additional "Spare" pair of wires (the 7/8 pair of wires in a standard RJ-45 jack configuration). This powering arrangement is made possible by the fact that standard Ethernet LAN cables have four pairs of wires, of which only two are used by most common data signaling protocols (e.g. 10BaseT and 100BaseT). However, there is a limit to the amount of power that can be provided in this way. Also, until the international standard has been fully specified and adopted, user concerns will remain unaddressed as to potential problems associated with transporting power through LAN wiring.

SUMMARY OF THE INVENTION

According to the present invention, use is made of the second "spare" pair of wires (the 4/5 pair of wires) in a standard Ethernet cable, in order to deliver power to a telephone set from a local source of AC or battery power. Preferably, the source is located within approximately three meters from the telephone. The powering arrangement of the present invention overcomes the problem of desktop clutter inherent in prior art schemes wherein power is delivered to the telephone via an additional power cord, yet eliminates any concerns associated with delivering power through Ethernet LAN wiring. The system of the present invention may be used to provide AC or battery power to the telephone. Furthermore, use of the second "spare" wiring pair allows the telephone to be designed for either "remote" or "local" spare pair powering (i.e. it allows the set power supply to accommodate the wide range of input voltages required by remote and local power sources).

BRIEF DESCRIPTION OF THE DRAWINGS

A preferred embodiment of the present invention is described herein below with reference to the drawings in which.

DETAILED DESCRIPTION OF THE PREFERRED EMBODIMENT

Figure 1:
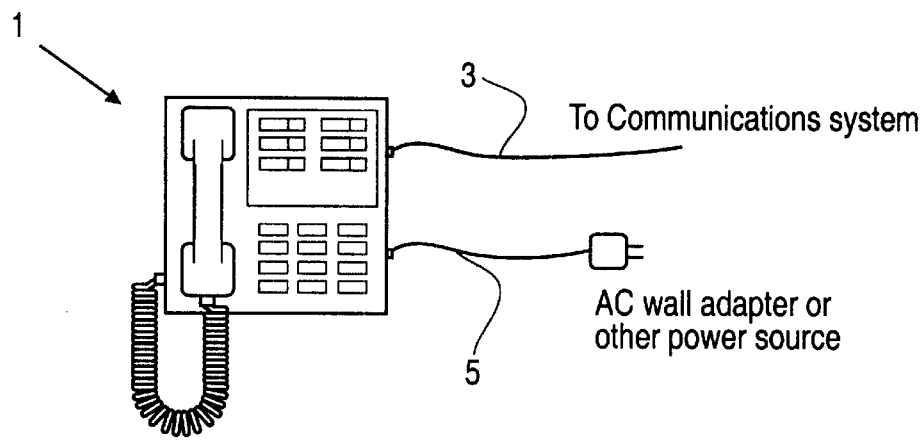
FIG. 1 is a schematic illustration of a prior art arrangement for providing power to a telephone set.

FIG. 1 shows a telephone set 1 having signal wires 3 connected to a communication system (e.g. PBX), and a power cord 5 connected via an AC wall adapter to a source of AC power (or battery power). As discussed above, such arrangements suffer from the disadvantage of contributing to desktop clutter.

Figure 2:
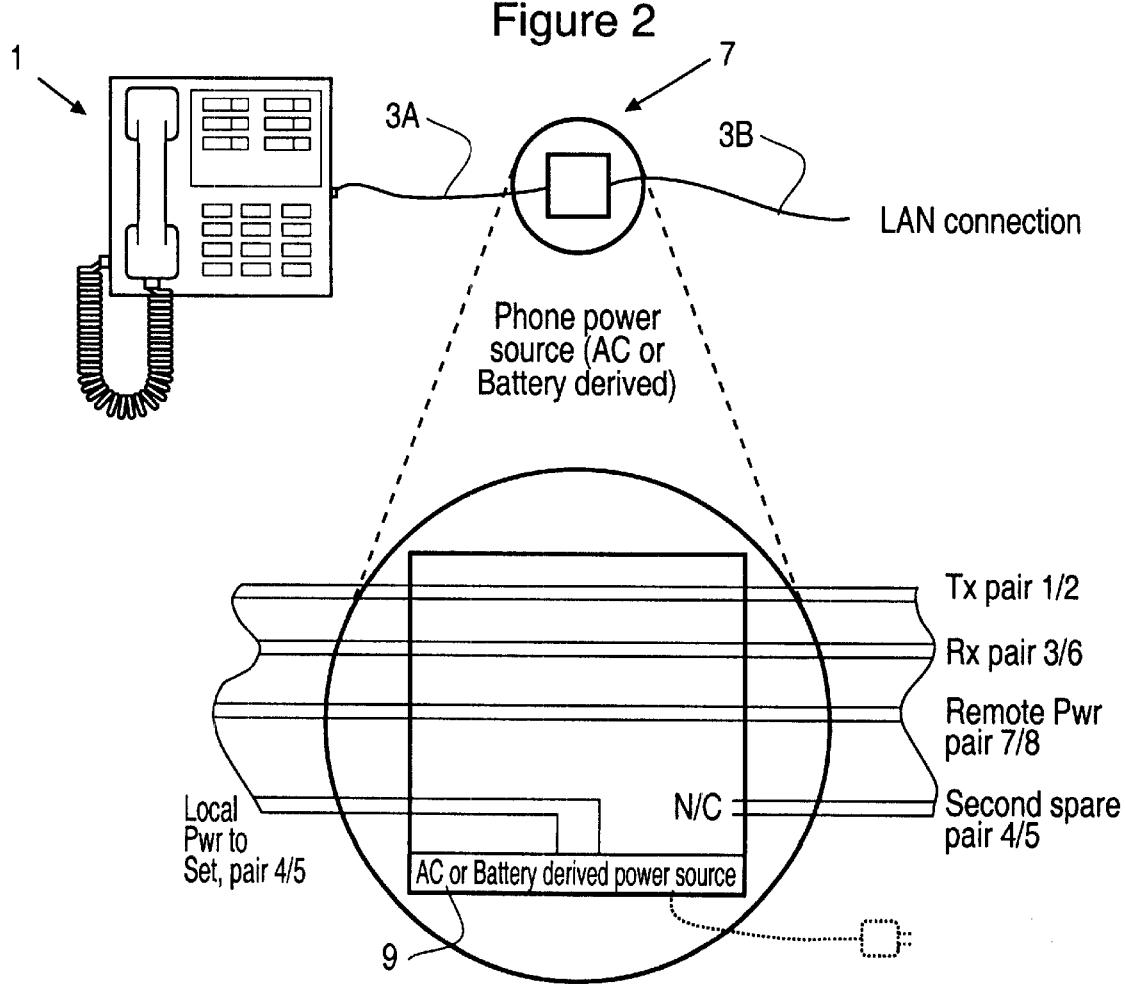
FIG. 2 is a schematic illustration of a telephone set powering arrangement according to the present invention.

With reference to FIG. 2, a powering arrangement is shown according to the present invention wherein power is supplied to the telephone set via the 4/5 pair of wires in a standard Ethernet LAN cable. A power unit 7 is provided, which may be conveniently placed a short distance (preferably less than three meters) from the telephone (e.g. on the floor next to a user's desk). The telephone 1 is connected to a telephone side RJ-45 connector of the unit 7 via wire 3A in a conventional way. The line side of the unit is connected to the standard Ethernet cable via wire 3B in a conventional way. Within the unit, the signal pairs (Tx pair 1/2 and Rx pair 3/6) and the first spare pair (Remote Pwr pair 7/8) of the Ethernet wire 3B are connected to the corresponding pairs of wires 3A. However, the second spare pair 4/5 from Ethernet cable 3B is left unconnected within the unit 7. An AC or DC (battery) power source 9 is provided within the unit 7 and connected to the spare pair 4/5 of cable 3A connected to the telephone set 1. Preferably, the power is delivered to the set 1 as DC so as not to interfere with data signals being carried on the other wire pairs.

According to the present invention, the voltage level required from the power supply is much lower (typically 12 V) than what is required for remote powering (i.e. −48 V), since the losses in the LAN cable are less than traditional powering arrangements due to the shorter cable length.

It will be appreciated that, although a particular embodiment of the invention has been described and illustrated in detail, various changes and modifications may be made. For example, although the invention is used to deliver power to a telephone set in the preferred embodiment, it is contemplated that other devices such as desktop computers, etc., may be powered in the same way. All such changes and modifications may be made without departing from the sphere and scope of the invention as defined by the claims appended hereto.

We claim:

1. A powering arrangement for providing power to an Ethernet connected device, comprising:

a power unit connected to a first cable carrying two signal wire pairs and two spare wire pairs, and connected to a second cable carrying two signal wire pairs and two spare wire pairs;

means within said power unit for connecting said signal wire pairs and a first one of said two spare wire pairs of said first cable to signal wire pairs and a first one of said two spare wire pairs of said second cable; and a source of power within said power unit, connected to a second one of said two spare wire pairs of said second cable for providing power to said device.

2. The powering arrangement of claim 1, wherein said second one of said spare wire pairs corresponds to pair 4/5 of said Ethernet cable.

3. The powering arrangement of claim 1, wherein said source of power is a DC battery source.

4. The powering arrangement of claim 1, wherein said source of power is an AC power source.

* * * * *